Figure 1:
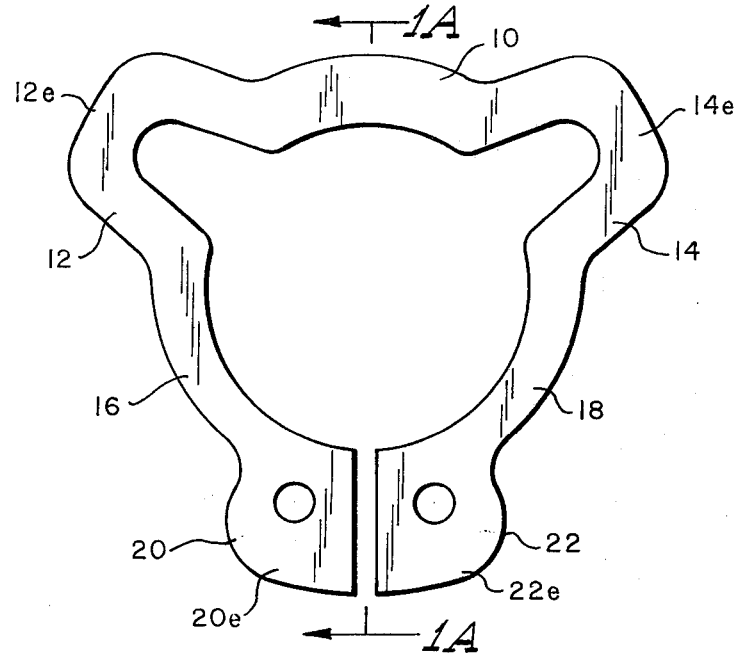

United States Patent [19]
Piatti et al.

[11] 3,934,866
[45] Jan. 27, 1976

[54] SPECIAL-PURPOSE SPRING RETAINING RINGS

[75] Inventors: Omar Piatti, New York; Wally Berliner, Floral Park, both of N.Y.

[73] Assignee: Waldes Kohinoor, Inc., Long Island City, N.Y.

[22] Filed: Oct. 8, 1974

[21] Appl. No.: 513,060

[52] U.S. Cl. ............................................. 267/161
[51] Int. Cl.² ............................................ F16F 1/34
[58] Field of Search ...................... 267/161; 251/297

[56] References Cited
UNITED STATES PATENTS

| | | | |
|---|---|---|---|
| 404,284 | 5/1889 | Johnson | 267/161 |
| 2,798,718 | 7/1957 | Gross | 267/161 |
| 2,973,182 | 2/1961 | Gill | 251/297 |
| 3,697,059 | 10/1972 | Fidi | 267/161 |
| 3,797,611 | 3/1974 | Hurt | 267/161 |

*Primary Examiner*—James B. Marbert
*Attorney, Agent, or Firm*—J. Harold Kilcoyne

[57] ABSTRACT

A special-purpose spring retaining ring adapted to be sprung into a circumferential groove provided therefor in a shaft, post, housing and the like, thereupon to form an artificial shoulder thereon, comprising: an open-ended ring body provided by circumferentially spaced-apart middle and sidewardly disposed (wing) arcuate length-portions having section heights which decrease progressively from the mid-section of the middle arcuate length-portion to the open gap-defining ends of the ring body, spaced-apart upright queen-truss formations interposed between and connecting the opposite ends of said middle arcuate length-portion to the adjacently disposed ends of said sidewardly disposed arcuate length-portions, the open ends of said ring body being shaped as outwardly extending formations, the outer edge of the beams of said truss formations and the outer edges of said ring-end formations extending as arcs of one and the same circle struck from the center of the ring body.

6 Claims, 4 Drawing Figures

SPECIAL-PURPOSE SPRING RETAINING RINGS

INTRODUCTION

This invention relates to improvements in spring retaining rings, and in particular to a special-purpose spring retaining ring of the external form capable, when assembled in its groove, i.e., spread and then released to spring-seat itself against the bottom of a groove for its reception in a shaft, rod, post, etc., of functioning as a positive stop for an abutting part, thus providing in effect a safety device in applications wherein said abutting part is likely to work itself loose.

BACKGROUND OF THE INVENTION

External spring retaining rings functioning when assembled in grooves provided for their reception in shafts, rods, posts and like cylindrical members as artificial shoulders for locating machine parts such as gears, bearing races, etc. in axial position thereon are well known and have received wide acceptance in industry. However, in attempting to extend the fields of their use it was learned that such rings when of the conventional design lack the surface area and shoulder-height requisite to the artificial shoulder provided thereby also serving as a positive stop for an abutting part likely to work itself loose, such as a nut threaded on a correspondingly threaded end of a shaft or post member. The obvious changes in ring structure designed to provide the ring body with the added surface area and greater shoulder height necessary to the ring being capable of functioning as a positive stop for use in the aforementioned special applications were unsatisfactory because said changes resulted in a ring lacking the flexibility required for proper ring functioning.

Thus, the problem requiring solution was one of devising an external spring retaining ring having surface area and shoulder height, effective or real, enabling the ring when sprung into a groove provided therefor in a shaft, post or like cylindrical member, to function as a positive stop for an abutting part, such as a nut which is subjected to friction forces from working itself loose (backing off) from said member, while maintaining the flexibility of the ring body necessary to the ring being assembled in and disassembled from its groove without taking on a permanent set.

THE INVENTION — IN GENERAL

The solution of the problem was found to be in the novel ring design of the present disclosure, according to which the ring body is formed partly as a conventional Truarc retaining ring of the external type, i.e., a ring according to patent to Heiermann U.S. Pat. No. 1,785,515 dated May 13, 1930 and its U.S. Pat. No. Re 18,144, and partly as a truss ring as disclosed in presently co-pending Wurzel and Millheiser continuation-in-part application Ser. No. 550,113, filed Feb. 14, 1975 (which with the present application is commonly owned). That is to say, the continuity of the Truarc ring body is interrupted by the incorporation therein of two upright (radially-outwardly projecting) queen-truss formations having radial center lines which are spaced approximately 120° from one another (illustratively 60° ± to opposite sides of the vertical center line of said ring body which extends upwardly through the ring gap and ring center) and from the outwardly extending end formations (apertured lugs, end hooks, etc.) together considered as a single radially outwardly extending projection. Further, the outer edges of the "beams" of the aforesaid truss formations and of said radially projecting end formations extend along arcs of the same circle struck from the ring center which has substantially greater diameter than that of the ring body proper.

Thus, it will be evident that the aforesaid radially-outwardly projecting truss formations disposed generally as described, acting in concert with the gap-defining end formations, provide the height of shoulder and the surface area requisite to the ring being capable of functioning as a positive stop for an abutting part, and that said two truss formations being flexible in their common plane, serve to supply added flexibility to the ring necessary to its being spread in assembly and disassembly without taking on a permanent set, and without which the ring would not function properly.

THE INVENTION — DETAILED DESCRIPTION

Figure 1A:
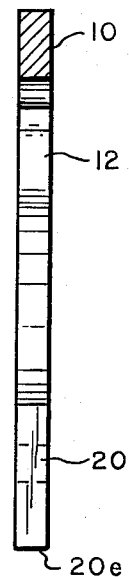
Figure 2:
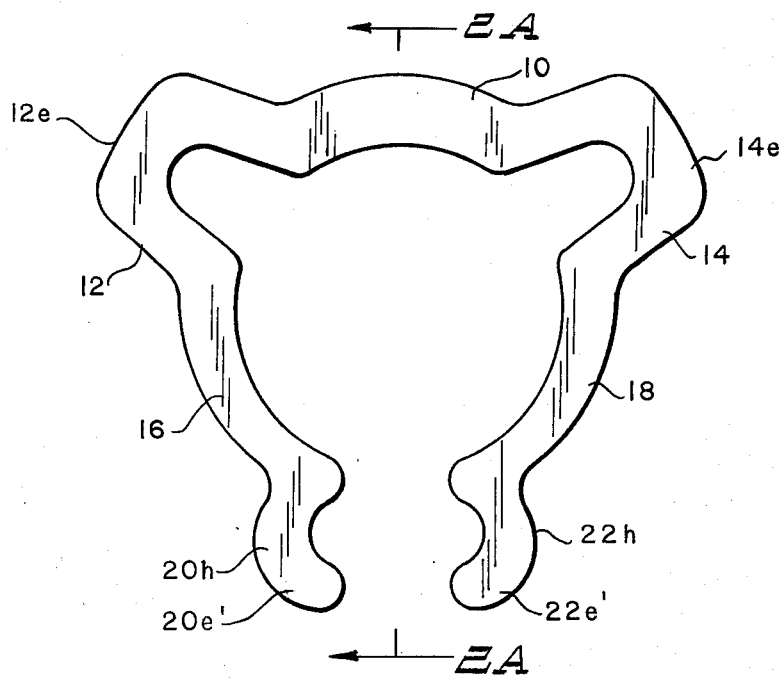
Figure 2A:
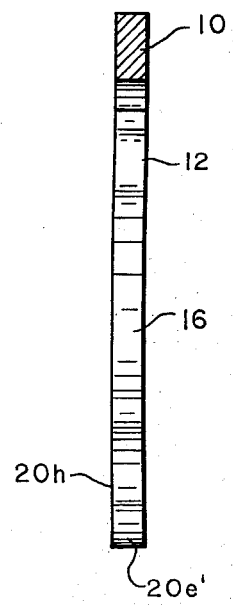

Referring now to the drawing, wherein FIGS. 1 and 2 are front-face plan views illustrating two embodiments of rings of the invention which differ only in the configuration of, and the width of gap between, the open ends of said rings and FIGS. 1A and 2A are vertical centerline sections thereof, it will be seen therefrom that a retaining ring of the invention basically comprises a uni-planar spring retaining ring of the external form, i.e., a ring which is adapted to be assembled in an outwardly opening, usually machined groove provided for its reception in the surface of a shaft, rod, pin, post and like cylindrical member, by being first spread over the end of said member and thereupon released at the groove whereupon it spring-seats itself against the groove bottom.

The drawing views further illustrate that the generally circular body of rings according to the invention combines structural features of the Truarc ring, i.e., a retaining ring according to the expired Heiermann U.S. Pat. No. 1,758,515 dated May 13, 1930 and its U.S. Pat. No. Re 18,144, with features of a so-called truss ring according to the copending Wurzel and Millheiser continuation-in-part application Ser. No. 550,113 filed Feb. 14, 1975 which with the instant application is commonly owned by the manufacturer of the Truarc rings. More particularly, said ring body preferably comprises three circumferentially spaced-apart albeit connected arcuate length-portions 10, 16, and 18, i.e., a middle and two sidewardly disposed arcuate length-portions, the section heights of which decrease progressively from the midsection of the middle arcuate length-portion 10 (which extends along a generally horizontal arc) to the gap-defining ends of said sidewardly (wing) disposed arcuate length-portions 16, 18 (the latter extending along generally upright arcs) which terminate at their lower ends in outwardly extending end formations, i.e., apertured lugs 20, 22 (FIG. 1) or in facing hook-from projections 20h, 22h (FIG. 2).

The aforesaid generally uprightly-extending arcuate length-portions 16, 18 are connected at their relatively upper ends to the opposite ends of said intermediate arcuate length-portion 10 by two radially-outwardly projecting formations 12, 14 having identical upright "queen-truss" configuration (hereinafter termed "truss formations") which are spaced approximately 120° from one another and from the end formations 20, 22 or 20h, 22h, together considered as a single radial outwardly extending projection, along the ring circle. More particularly, said truss formations 12, 14 are symmetrically disposed 60° ± to opposite sides of the vertical center line of the ring body, i.e., the line extending upwardly through the gap between its said end formations and the ring center, and each said truss formation is disposed 120° ± from said end formations considered as a single radial outwardly-extending projection. Also noteworthy is that the outer edges 12e, 14e of the "beams" of the truss formations 12 and 14 and the outer edges 20e, 22e of said end formations (20, 22 or 20h, 22h) are generally arcuate and extend along arcs of a circle struck from the ring center, and thus a ring according to the present design has an effective height of soulder and a surface area substantially greater than that provided by rings of the conventional Truarc design. In addition, because the truss formations 12, 14 are subantially more flexible in their common plane than correspondingly shaped but solid-material formations, such as tabs designed only to add surface area and effective shoulder-height to conventional Truarc rings, the incorporation of said truss formations in the ring body of rings of the Truarc type as herein proposed, adds a measure of extra flexibility (resistance to taking a permanent set when spread) to the rings, such in addition to increased surface area and height of shoulder as aforesaid.

Admittedly, rings according to the present invention may not be as flexible as rings constructed according to the aforementioned Wurzel and Millheiser application featuring a multiplicity of closely spaced, low-height truss formations disposed throughout substantially the full arcuate length of the ring body. Nevertheless, a ring according to the present invention which is characterized by but a few high and widely spaced truss formations and which are similarly spaced from high ring-end formations together considered as a single radially-outward projection as described, offers certain inherent advantages, among them the following:

a. Greater ring material in contact with the groove walls, thereby increasing both the groove bearing strength and the ring shear strength, as compared to rings of the Wurzel and Millheiser design.

b. The truss height being substantially larger than that of the Wurzel-Millheiser design provides a correspondingly higher thrust shoulder against the abutting part. If an attempt were made to increase the shoulder height of the Wurzel-Millheiser design while maintaining the same large number of trusses, a ring would result which would be extremely resilient and vulnerable to being pushed out of the groove under very little load or opening up under a very low R.P.M.

c. A large gap between the ring-end formations, particularly when the latter are shaped as facing hooks per FIGS. 2 and 2A, opens up the possibility of ring automation by providing a means enabling simple mechanical alignment of rings coming from a hopper or similar source and for automating the ring opening by use of mechanical wedge means.

d. Due to its large gap as aforesaid, it is possible to utilize the ring as an internal ring in those special applications wherein a shallow groove and low thrust-load capability are encountered.

e. Since a number of ring sizes up to the very large-ring sizes can be designed with only three widely spaced, radially outwardly extending projections, i.e., two truss formations and an end formation (lugs or hooks counted as one formation) the forming die can be of simple construction to a degree which could eventually influence the ring price.

f. As a result of its large arch height in comparison to the Wurzel-Millheiser design, a means is provided whereby in cases where the end lugs are inaccessible the ring can be removed from the groove by insertion of plier tips or the like into the spaces to the undersides of the beams of two high truss formations.

From the foregoing, it will be appreciated that the invention provides novel and useful concepts and practical advantages over the prior rings, and accordingly the following claims are made thereto.

We claim:

1. A special-purpose spring ring adapted to be sprung into groove provided therefor in a shaft, post, housing bore surface and the like and to function as an artificial shoulder thereon comprising: an open-ended uni-planar ring body provided by circumferentially spaced-apart middle and sidewardly disposed arcuate length-portions having section heights which decrease progressively from the mid-section of said middle arcuate length-portion to the open ends of the ring body which define the ring gap, an upright queen-truss formation interposed between and connecting ends of the opposite ends of said middle arcuate length-portion to the adjacently disposed end of a sidewardly disposed arcuate length-portion, the outer edges of the beams of said truss formations extending along arcs of a circle struck from the ring-body center, the open ends of the ring body having radially outwardly extending end-formations, the outer edges of which are generally arcuate and lie on the same circle as that of the outer edges of the beams of said truss formations.

2. A special purpose spring retaining ring according to claim 1, wherein the open gap-defining ends of the ring body have apertured lug-formation.

3. A special-purpose spring retaining ring according to claim 1, wherein the gap-defining ends of the ring body have facing open-hook formation.

4. A special-purpose spring retaining ring according to claim 1, wherein the ring body proper is provided by said middle and but two sidewardly disposed arcuate length-portions, connected by two queen-truss formations each disposed as aforesaid.

5. A special-purpose spring retaining ring according to claim 4, wherein said two upright queen-truss formations are spaced approximately 120° from one another and from the radially extended end-formations together considered as a single radially extended formation.

6. A special-purpose spring retaining ring according to claim 4, wherein said two upright queen-truss formations are symetrically disposed on opposite sides of the vertical center line of the ring which extends through the ring gap, the ring-body center and the mid-section of said middle arcuate length-portion, and further are spaced approximately 120° from one another and from the radially extended end formations considered as a single radially extended formation.

\* \* \* \* \*